United States Patent [19]

Braden

[11] Patent Number: 5,161,323
[45] Date of Patent: Nov. 10, 1992

[54] EXPANSIBLE FISHING LURE WITH AUTOMATIC HOOK

[76] Inventor: Daniel L. Braden, 23020 L. Drive N., Marshall, Mich. 49068

[21] Appl. No.: 795,060

[22] Filed: Nov. 20, 1991

[51] Int. Cl.$^5$ ............................................. A01K 83/00
[52] U.S. Cl. ............................................. 43/37; 43/35
[58] Field of Search ........... 43/37, 36, 35, 34, 42.02, 43/42.04, 42.41, 42.44

[56] References Cited

U.S. PATENT DOCUMENTS

| | | |
|---|---|---|
| 1,557,644 | 10/1925 | Andersen . |
| 1,609,151 | 11/1926 | Bruenig ................... 43/37 |
| 1,638,923 | 8/1927 | Danielson ............... 43/37 |
| 1,670,174 | 5/1928 | Wiersma . |
| 1,994,878 | 3/1935 | Smith et al. ............. 43/37 |
| 2,244,980 | 6/1941 | Abramson . |
| 2,463,978 | 3/1949 | Kunzelman . |
| 2,748,520 | 6/1956 | Anderson . |
| 2,854,778 | 10/1958 | Polki ....................... 43/35 |
| 2,906,051 | 9/1959 | O'Bryan .................. 43/35 |
| 2,968,113 | 1/1961 | Multanen . |
| 3,411,233 | 11/1968 | Hopper .................... 43/37 |
| 3,631,624 | 1/1972 | Edde . |
| 3,765,118 | 10/1973 | Reitler . |
| 3,802,114 | 4/1974 | Diebold ................... 43/37 |
| 3,818,626 | 6/1974 | Peippo . |
| 4,031,652 | 6/1977 | Johnson . |
| 4,274,220 | 6/1981 | Rogers, Jr. . |
| 4,442,622 | 4/1984 | Sartain .................... 43/37 |
| 4,765,084 | 8/1988 | Braden . |
| 4,782,618 | 11/1988 | Rainey . |
| 4,827,656 | 5/1989 | Ohnishi . |
| 4,905,401 | 3/1990 | Fukumoto . |

Primary Examiner—Richard K. Seidel
Assistant Examiner—Chuck Y. Mah
Attorney, Agent, or Firm—Flynn, Thiel, Boutell & Tanis

[57] ABSTRACT

A fishing lure includes first and second body parts movable between adjacent and spaced positions. The second body part has a slot, and a hook supported on the first body part is movable within the slot between two positions in which the point on the hook is respectively retracted and exposed. A retaining member on the second body part engages the hook as the body parts move apart in order to prevent relative movement of the body parts beyond the spaced position. An elongate member has an end coupled to the hook and extends through an opening in the second body part and an opening in a bead disposed against the second body part, the bead frictionally engaging the elongate member to yieldably resist relative sliding movement therebetween and yieldably resist movement of the body parts away from each other.

17 Claims, 2 Drawing Sheets

1

EXPANSIBLE FISHING LURE WITH AUTOMATIC HOOK

FIELD OF THE INVENTION

This invention relates to a fishing lure and, more particularly, to a fishing lure of the type having a retractable hook.

BACKGROUND OF THE INVENTION

Where a fishing lure has a non-movable exposed hook, the hook will often snag weeds or other objects as it moves through the water during trolling, which sometimes breaks the fishing line and causes loss of the lure, or alternatively results in a large piece of seaweed being snagged on and trailing behind the lure and thus rendering the lure unappealing to fish who might otherwise strike it.

Over the years, a number of lures have been developed which have a retractable hook. In particular, the hook is normally in a retracted position, but when a fish strikes the lure, the hook moves to an exposed position in which it can hook the fish and thus ensure the fish does not escape. When the hook is in the retracted position, the lure can pass through weeds and the like without snagging. An example of such a lure is Applicant's own prior U.S. Pat. No. 4,765,084.

Although the various pre-existing lures have been generally adequate for their intended purposes, they have not been satisfactory in all respects. Accordingly, it is an object of the present invention to provide a lure of the type described above which is very simple in structure and inexpensive to manufacture, yet which operates very dependably.

It is a further object of the invention to provide a lure, as aforesaid, which is durable and rugged, and which will have a relatively long useful lifetime with little or no maintenance.

SUMMARY OF THE INVENTION

The objects and purposes of the invention, including those set forth above, are met according to one form of the invention by providing a fishing lure which includes a body member having an opening therein, a hook having a point and movable between retracted and exposed positions in which the point is disposed within the opening and disposed outwardly of the body member, an arrangement for effecting movement of the hook, an elongate member coupled at one end of the hook, and an arrangement frictionally cooperable with the elongate member for yieldably resisting lengthwise movement thereof relative to the body member.

According to a different form of the invention, the lure includes first and second body parts movable relative to each other between first and second positions in which the body parts are respectively adjacent and spaced, a hook supported on said first body part, and an arrangement on the second body part engagable with the hook when the body parts are in the space position for preventing relative movement of the body parts in a direction away from each other beyond the second position.

BRIEF DESCRIPTION OF THE DRAWINGS

Preferred embodiments of the invention will be described in detail hereinafter with reference to the accompanying drawings, in which.

DETAILED DESCRIPTION

Figure 1:
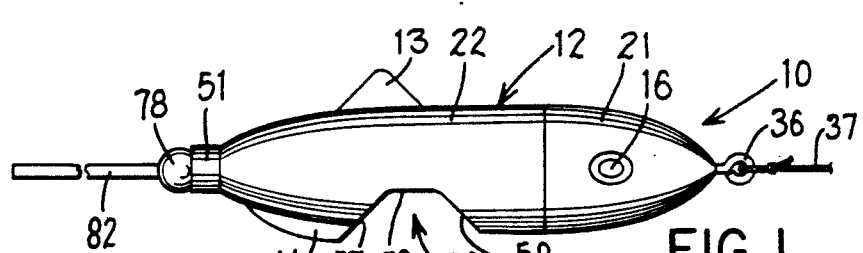
FIG. 1 is an elevational side view of a fishing lure embodying the present invention.
Figure 2:
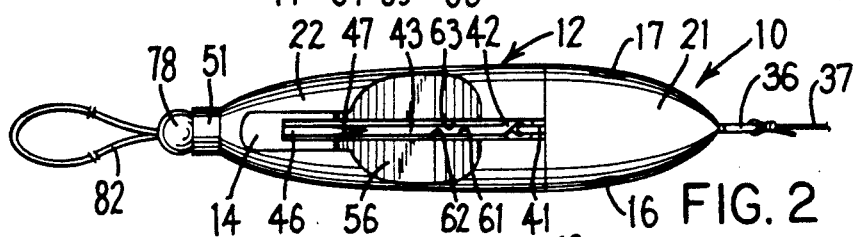
FIG. 2 is a bottom view of the lure of FIG. 1.

A first preferred embodiment of a fishing lure according to the present invention is shown at 10 in FIGS. 1 and 2. The lure includes a body 12 made of a plastic material. The body 12 has two fins 13 and 14, and has two eyes 16 and 17 on opposite sides thereof, so that the lure has the general appearance of a small fish. The body 12 includes two physically separate body parts 21 and 22.

Figure 3:
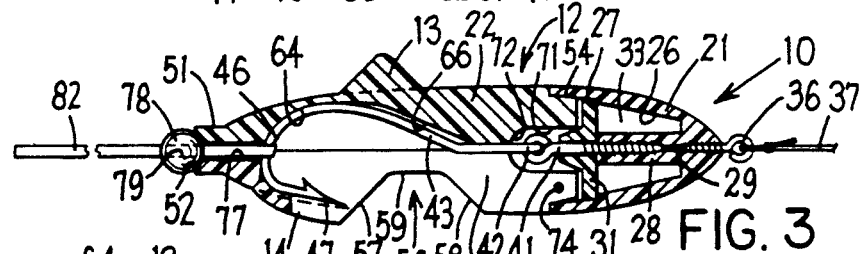
FIG. 3 is a central sectional side view of the lure of FIG. 1.
Figure 4:
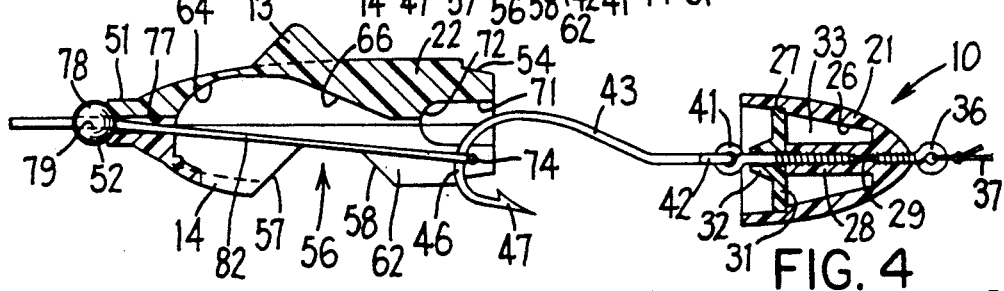
FIG. 4 is a sectional view similar to FIG. 3 but showing the lure in a different operational position.

Referring to FIGS. 3 and 4, the body part 21 has a generally parabolic cross-sectional shape when viewed from the side, and in an end view has a circular cross-sectional shape. The eyes 16 and 17 are provided on opposite sides of the body part 21. The body part 21 has extending into it from a rear end thereof a recess 26, and a rearwardly facing annular step 27 is provided on the body part 21 within the recess at a location spaced a short distance from the rear end of the body part 21. A cylindrical projection 28 extends rearwardly into the recess from a front end portion of the body part 21, the rear end of the projection being substantially coplanar with the surface of the annular step 27. A hole 29 extends centrally through the body part 21 from the front end to the rear end of the cylindrical projection 28.

The body part 21 includes a disk 31 which is disposed within the recess 26 so as to have its central portion engaging the rear end of the projection 28 and its peripheral edge disposed against the surface of the annular step 27. The disk 31 is preferably secured to the projection 28 and annular step 27 by any suitable adhesive which is conventional and commercially available. This creates a sealed air chamber 33 within the body part 21, which imparts a degree of buoyancy to the lure. The disk 31 has at its center a frustoconically shaped rearward projection 32, the rear end of which is slightly forward of the rear end of the overall body part 21.

A screw eye 36 is provided at the front end of the lure, and has its threaded shank screwed into the front end of the hole 29. A conventional fishing line 37 is attached to the screw eye 36. A further screw eye 41 is provided at the rear end of the body part 21, and has a shank which extends through a central opening provided in the disk 31 and projection 32, and threadedly engages the rear portion of the hole 29. An eye 42 at the shank end of a center draft fish hook 43 is coupled to the screw eye 41 so that the fish hook 43 can pivot sideways and also up and down relative to the body part 21. The fish hook 43 has at its opposite end a bend portion 46, and adjacent the bend portion 46 is a hook end 47 having the usual point and barb.

The body part 22 is also made of plastic, and also has a generally parabolic cross-sectional shape in a side view and a generally circular cross-sectional shape in an end view. The fins 13 and 14 are provided on body part 22. Referring to FIGS. 1 and 2, the body part 22 has at a rear end thereof a short rearwardly projecting cylindrical tail 51, the outer end of which has a shallow semi-cylindrical recess 52 (FIGS. 3 and 4). In addition, with reference to FIGS. 3 and 4, the body part 22 has at its forward end an annular recess 54 which can receive the annular rear portion of the body part 21 in the manner shown in FIG. 3.

As best seen in FIGS. 1 and 3, the body part 22 has in an underside thereof a recess 56 which is approximately trapezoidal in a side view and which has inclined surface portions 57 and 58 which converge upwardly to an upper surface portion 59. The body part 22 also has a narrow lengthwise slot 61 which extends upwardly into the body part 22 from the underside thereof and also opens through the forward end of the body part 22. The slot 61 has spaced parallel walls 62 and 63 (FIG. 2) defining opposite sides thereof, and has a top surface 64. As best seen in FIG. 3, the top surface 64 has a shape similar to the shape of the hook 43, and includes a portion 66 which is inclined to extend downwardly and forwardly.

A cylindrical bore 71 extends into the body part 22 from the front end thereof, and has a semispherically curved inner end 72. The bore 71 receives the eyes 41 and 42 when the lure is in the operational position of FIG. 3. A metal pin 74 extends transversely across the slot 61 at a location near the front end of body part 22 and below the cylindrical bore 71, the pin 74 having its opposite ends disposed in respective ends of a hole which extends completely through the body part 22 coaxially with pin 74, lengthwise movement of the pin 74 being prevented by tight frictional engagement of the ends of the pin 74 with the hole.

A cylindrical hole 77 extends horizontally and forwardly from the outer end of the cylindrical tail 51 to the rear end of the slot 61. A retaining member 78 which is a plastic bead has a cylindrical hole 79 extending through it, the hole 79 preferably having a smaller diameter than the hole 77. An elongate member 82, which in the preferred embodiment is a conventional rubber band, has one end looped around the bend portion 46 of the fish hook 43, extends through the hole 77 in body part 22 and the hole 79 in bead 78, and has its opposite end extending rearwardly away from the body part 22 and bead 78. The hole 77 is of sufficient diameter so that the rubber band 82 can freely slide therein, but the hole 79 is of sufficiently smaller diameter so that the rubber band 82 can move lengthwise relative to the bead 78 but frictional engagement therebetween tends to yieldably resist such movement. Of course as the rubber band is stretched, its cross-sectional size will tend to decrease, which has the effect of reducing the amount of friction and thus facilitating movement of the bead 78 relative to the rubber band. It will be recognized, however, that the elongate member 82 does not necessarily have to be resilient for purposes of the present invention.

Figure 5:
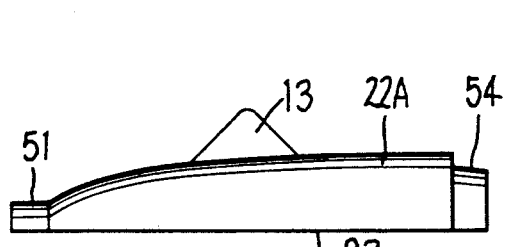
FIG. 5 is a side view of a component of the lure of FIG. 1.
Figure 7:
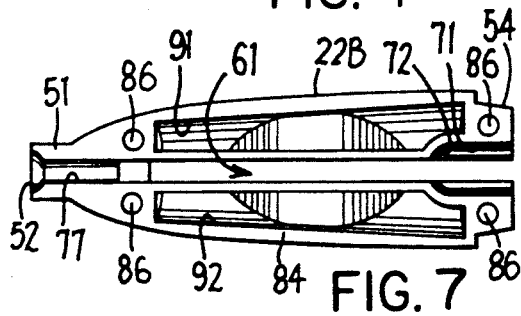
FIG. 7 is a top view of a further component of the lure of FIG. 1.
Figure 6:
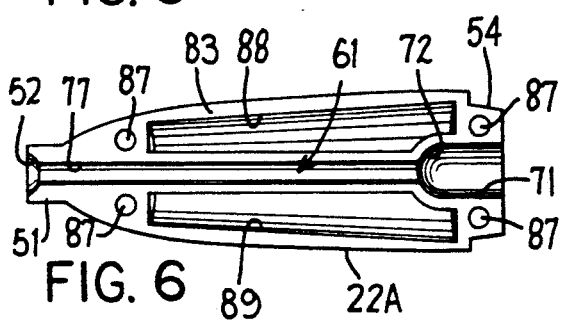
FIG. 6 is a bottom view of the component of FIG. 5.
Figure 8:
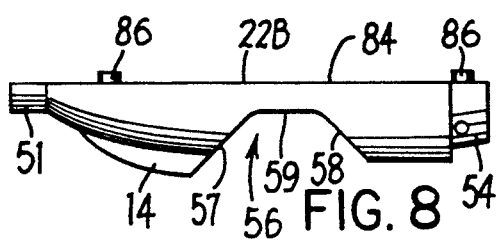
FIG. 8 is a side view of the component of FIG. 7.

In the preferred embodiment, the body part 22 is made from two separate plastic components which are permanently secured to each other by any suitable adhesive which is conventional and commercially available. One of these components is shown at 22A in FIGS. 5 and 6, and defines the upper portion of the body part 22, and the other component is shown at 22B in FIGS. 7 and 8 and defines the lower portion of the body part 22. The components 22A and 22B have respective planar mating surfaces 83 and 84 thereon which are in engagement and adhesively secured to each other when the lure is assembled. The component 22B has four cylindrical positioning studs 86 which project upwardly at symmetrically spaced locations from surface 84, and which are each snugly received in a corresponding one of four vertical cylindrical bores 87 extending into the component 22A from surface 83. In addition, the component 22A has two elongate recesses 88 and 89 disposed on opposite sides of the slot 61, and the component 22B has two elongate recesses 91 and 92 on opposite sides of the slot 61, the recesses 89 and 91 together forming a first sealed air chamber when the components 22A and 22B are secured to each other, and the recesses 88 and 92 likewise forming a second sealed air chamber when the components 22A and 22B are secured to each other. These two air chambers, as well as the air chamber 33 in the body part 21, provide a degree of buoyancy to the lure 10 which is just sufficient to cause the lure to float when it is not moving through the water, but which is not sufficient to keep it on top when the lure is being pulled through the water at a normal trolling speed, as a result of which the lure will move through the water a small distance below the surface.

Figure 11:
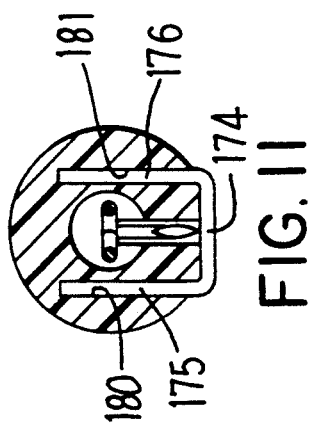
FIG. 11 is a sectional view taken along the line 11—11 of FIG. 9.
Figure 9:
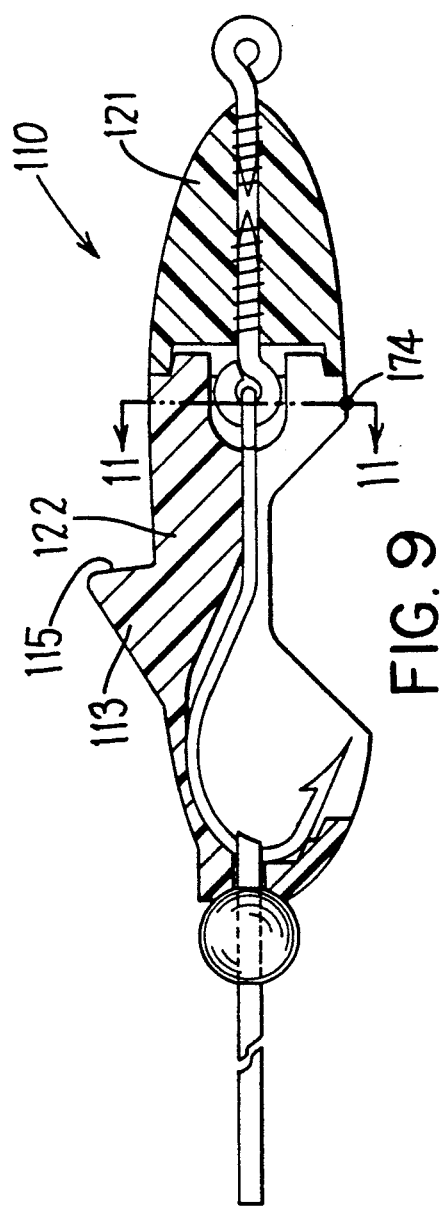
FIG. 9 is a central sectional side view similar to FIG. 3 of an alternative embodiment of the lure of FIG. 1.
Figure 10:
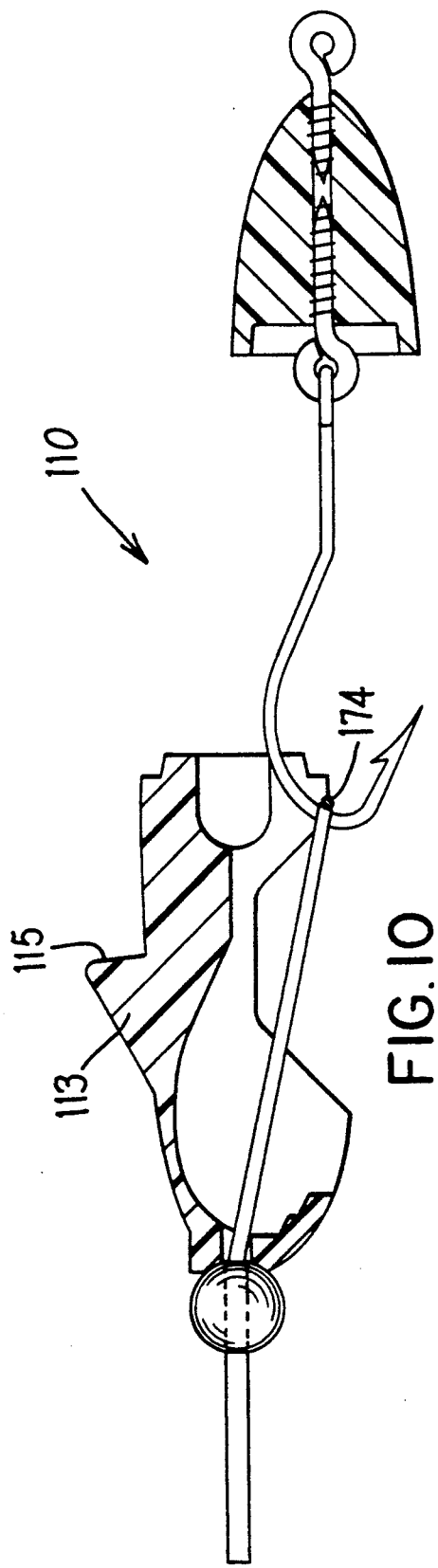
FIG. 10 is a sectional view similar to FIG. 9 but showing the lure in a different operational position.

FIGS. 9–11 show a lure 110 which is an alternative embodiment of the lure shown in FIGS. 1–8. The lure 110 is similar in many respects to the lure 10, and equivalent parts are identified with the same reference characters as in FIGS. 1–8. Only the important differences will be described in detail.

First, the lure 110 has body parts 121 and 122, which differ from the body parts 21 and 22 in that there are no recesses therein which serves as air chambers. In the case of the body part 121, this permits the part to be a single solid integral piece of plastic. The body part 122 is preferably manufactured in the form of two components which are adhesively secured to each other, and which are respectively similar to the components 22A and 22B shown in FIGS. 5–8 except that the recesses 88, 89, 91 and 92 are omitted. In view of the lack of air chambers in the body parts 121 and 122, buoyancy is imparted to the lure 110 by mixing with the plastic material a conventional powder-like buoyant material. The degree of buoyancy is determined by the proportional amount of powder-like material used. For pour molding, a suitable material commonly referred to as "microballoons" or "ceramicspheres" can be obtained from PQ Corporation of Valley Forge, Pa. For injection molding, any one of a number of conventional substances commonly referred to in the art as "blowing agents" may be used.

A second difference is that a transversely extending pin 174 is, as shown in FIG. 11, the bight of a U-shaped member having upwardly extending legs 175 and 176 which are each received in a respective one of two vertical holes 180 and 181 in the body part 122.

A third difference is that the fin 113 on body part 122 has a front edge 115 which extends outwardly from the body part 122 at almost a right angle thereto. If a fish takes the lure and the fin 113 is within the fish's mouth, the steeply inclined edge 115 will tend to prevent the body part 122 from being easily pulled out of the fish's mouth.

OPERATION

With reference to the embodiment of FIGS. 1-8, the lure 10 is pulled through water by the line 37 with the body parts 21 and 22 in the relative positions shown in FIGS. 1-3, in which they are adjacent and in contact with each other. When the body parts are in this adjacent position, the fish hook 43 is completely retracted within the slot 61 with the hook closely adjacent the top surface 64, and with the point and barb disposed within the slot. The portion of the rubber band 82 between the bead 78 and the fish hook 43 has a small amount of lengthwise tension, which keeps the fish hook 43 firmly seated against the surface 64 of the slot 61 and prevents the body parts 21 and 22 from moving apart. As the lure 10 moves through the water, it can pass through weeds without snagging any weeds with the hook. Also the trailing portion of the rubber band 82 will tend to waggle a bit. This, in combination with the overall shape of the body 12 and the provision thereon of the eyes 16 and 17 and fins 13 and 14, gives the impression of a small fish swimming through the water. In time, a fish will strike the lure, usually from the rear. Typically, the lower jaw of the fish will be within the recess 56. Thus, when the fish strikes the lure and attempts to swim away, thereby pulling on the body part 22, the recess 56 and fin 14, and also possibly fin 13, will tend to prevent the body part 22 from easily slipping out of the mouth of the fish.

As the fish pulls on the body part 22, the body part 22 will begin to move away from the body part 21, which means that almost immediately the point at the end 47 of the fish hook 43 will move to an exposed position within the recess 56 and will pierce the lower jaw of the fish, thus making it even more difficult for the fish to lose hold of the lure. If the fisherman tugs on line 37, it will also assist movement of parts 21 and 22 away from each other. As the body part 22 moves rearwardly relative to the fish hook 43, the lengthwise force exerted on the rubber band 82 overcomes the limited amount of friction between the rubber band 82 and bead 78 so that the rubber band slides forwardly within the bead 78. When wet, the rubber band slides a little more easily relative to the bead than when dry. Also, the tension on the rubber band will slightly reduce the cross section of the rubber band within the hole 79 and bead 78, which helps to permit sliding movement of the rubber band within the bead, but while this is a feature of the preferred embodiment it is not essential to operation of the lure.

As the body part 22 continues to move rearwardly relative to the fish hook 43, the inclined surface 66 will tend to force the rearward portion of the fish hook 43 downwardly, in order to maintain the point and barb on the end portion 47 in a fully exposed position. Ultimately, the bend portion 46 of the fish hook 43 engages the transversely extending pin 74. In this position, the body part 22 is in a position spaced from the body part 22, and cooperation between the hook 43 and pin 74 prevents the body parts 21 and 22 from further movement away from each other. It will thus be noted that, in this position, the only structure extending between and operatively coupling the body parts 21 and 22 is the fish hook 43 itself. A further feature is that, because the bead 78 has slid relative to the rubber band 82, the rubber band 82 will not have sufficient tension to pull the hook 47 all the way back into the slot 61 to the fully retracted position shown in FIG. 3. This minimizes the extent to which the rubber band 82 urges the fish hook 43 to move out of engagement with the fish and thereby minimizes the likelihood that the lure itself would allow the fish to escape.

Ultimately, the fisherman will successfully reel in the fish and unhook the fish from the fish hook 43. As just mentioned, the lure is intentionally designed so that the rubber band 82 will not at this point have sufficient tension to automatically pull the hook 43 all the way back to the retracted position to FIG. 3. In order to restore the lure 10 to its original condition, the fisherman holds the bead 78 with one hand and then uses his other hand to manually pull on the trailing end of the rubber band 82, thereby causing the rubber band 82 to slide rearwardly within the bead 79 while simultaneously pulling the fish hook 43 back into the slot 61, which in turn causes the body part 21 to move back into engagement with the body part 22. When these parts are back in the position shown in FIGS. 1-3, the fisherman lets go of the rubber band 82 and bead 78. Nevertheless, since the fisherman has pulled on the rubber band 82, the frictional cooperation between the bead 78 and rubber band 82 will leave a small amount of residual tension in the portion of the rubber band 82 extending between bead 78 and the fish hook 43. Thus, the lure 10 will be back in its original condition.

At the point in time when a fish strikes the lure and attempts to swim away with the body part 22 in its mouth, the force exerted by the fish may cause the body part 22 to tilt somewhat with respect to the body part 21, particularly if the fish attempts to swim away in a direction transverse to the direction of movement of the lure 10 through the water. In this situation, the rear edge of the body part 21 moves a small distance away from the annular recess 54 on one side of the lure, while on the diametrically opposite side the rear edge of body part 21 remains in firm contact with the recess 54. The cooperating eyes 41 and 42 permit the body part 22 to be tilted in this manner in any direction relative to body part 21 without any bending of the hook 43. As the amount of relative tilt increases, the eye 1 will move progressively forwardly, thereby causing the pointed end of hook 47 to move into an exposed position in the recess 56 and thus pierce the skin on the lower jaw of the fish. It will be noted from FIG. 3 that the pointed end of the hook is positioned very close to the recess 56 so that only a minimal amount of forward movement of the hook is required to move the pointed end of the hook into the recess. This is intended to ensure that, even in the case of a light strike on the lure, even a small amount of resulting tilt will move the hook 43 forwardly enough to cause the point to pierce the jaw of the fish and thus minimize the likelihood of an escape of the fish.

The alternative embodiment of FIGS. 9-11 operates is substantially the same manner as has been described above for the embodiment of FIGS. 1-8. Accordingly, a detailed discussion of the operation of the alternative embodiment is omitted.

Although two preferred embodiments of the invention have been disclosed in detail for illustrative purposes, it will be recognized that there are variations or modifications of these devices, including the rearrangement or reversal of parts, which lie within the scope of the present invention.

The embodiments of the invention in which an exclusive property or privilege is claimed are defined as follows:

1. A fishing lure comprising: a body member having an opening therein, a hook having a point and movable between a retracted position in which said point is disposed within said opening and an exposed position in which said point is disposed outwardly of said body member; means for effecting movement of said hook from said retracted position to said exposed position; an elongate member coupled at one end directly to said hook, wherein as said hook moves from said retracted position to said exposed position said hook pulls said elongate member and effects movement thereof in a lengthwise direction toward said one end thereof; and means frictionally cooperable with said elongate member for yieldably resisting lengthwise movement thereof relative to said body member in said direction corresponding to movement of said hook from said retracted position to said exposed position.

2. A lure of claim 1, wherein said elongate member has a degree of inherent lengthwise resiliency.

3. A lure of claim 1, wherein said means for yieldably resisting lengthwise movement of said elongate member includes means defining a further opening through which said elongate member extends, frictional engagement between said elongate member and an inner surface of said further opening serving to yieldably resist lengthwise movement of said elongate member relative to said opening.

4. A lure of claim 3, wherein said elongate member has a degree of inherent lengthwise resiliency.

5. A lure of claim 3, wherein said means for yieldably resisting lengthwise movement includes a retaining member which is separate from and disposed against said body member, and which has therethrough said further opening which frictionally engages said elongate member.

6. A lure of claim 5, wherein said body member has therein an opening through which said elongate member extends, wherein said retaining member is a spherical bead, and wherein said elongate member is a rubber band having an end through which said hook extends.

7. A lure of claim 1, wherein said elongate member is flexible and nonrigid.

8. A fishing lure comprising: a body member having an opening therein, a hook having a point and movable between a retracted position in which said point is disposed within said opening and an exposed position in which said point is disposed outwardly of said body member; means for effecting movement of said hook from said retracted position to said exposed position; an elongate member coupled at one end to said hook; and means frictionally cooperable with said elongate member for yieldably resisting lengthwise movement thereof relative to said body member in a direction corresponding to movement of said hook from said retracted position to said exposed position; wherein said means for effecting movement of said hook includes a body part which is separate from and movable relative to said body member between first and second positions in which said body part and body member are respectively adjacent and spaced, said body part having means for supporting thereon an end of said hook remote from said point, and said hook being moved from said retracted position to said exposed position in response to movement of said body part and body member from said first position to said second position, and wherein said body member has a portion engageable with said hook for preventing relative movement of said body part and body member beyond said second position.

9. A lure according to claim 8, wherein said opening in said body member is a slot, and wherein said portion of said body member engageable with said hook is a pin extending transversely across said slot and having its opposite ends anchored in portions of said body member disposed on opposite sides of said slot.

10. A lure of claim 8, wherein said opening in said body member is a slot, and including a U-shaped member having two spaced legs disposed in respective openings provided in said body member on opposite sides of said slot, and having a bight which extends between said legs in a direction transversely across said slot, said bight being said portion of said body member engageable with said hook.

11. A lure of claim 8, wherein said means supporting said hook on said body part includes means facilitating pivotal movement of said hook relative to said body part.

12. A lure, comprising: first and second body parts movable relative to each other between first and second positions in which said body parts are respectively adjacent and spaced, a hook supported on said first body part, and means on said second body part engageable with said hook when said body parts are in said second position for preventing relative movement of said body parts in a direction away from each other beyond said second position, wherein only said hook extends between said first and second body parts when said first and second body parts are in said second position.

13. A lure of claim 12, wherein said second body part has a slot therein, said hook being slidable within said slot in response to relative movement of said body parts, and wherein said means for preventing movement beyond said second position includes said second body part having a pin extending transversely across said slot.

14. A lure of claim 13, wherein said hook has a point, wherein when said body parts are in said first position said point on said hook is within said slot, and wherein when said body parts are in said second position said point on said hook is in an exposed position disposed outwardly of said second body part.

15. A lure of claim 12, wherein said second body part has a slot therein which movably receives said hook, and wherein said means for preventing movement includes a bent wire member having end portions which extend into respective holes provided in said second body part on opposite sides of said slot, and having a central portion between said end portions which extends transversely across said slot.

16. A lure, comprising: first and second body parts movable relative to each other between first and second positions in which said body parts are respectively adjacent and spaced, a hook supported on said first body part, and means on said second body part engageable with said hook when said body parts are in said second position for preventing relative movement of said body parts in a direction away from each other beyond said second position, wherein said second body part has a slot therein which movably receives said hook, and wherein said means for preventing movement includes a U-shaped member having two spaced legs which respectively extend into respective holes provided in said second body part on opposite sides of said slot, and having a bight which extends between said legs transversely across said slot.

17. A lure of claim 16, wherein said hook has a point, wherein when said body parts are in said first position said point is disposed within said slot, and wherein when said body parts are in said second position said point on said hook is in an exposed position disposed outwardly of said second body part.

* * * * *